(12) United States Patent
Ishikawa

(10) Patent No.: US 12,155,796 B2
(45) Date of Patent: Nov. 26, 2024

(54) MANAGEMENT SYSTEM, CONTROL METHOD OF MANAGEMENT SYSTEM, AND RECORDING MEDIUM

(71) Applicant: Canon Kabushiki Kaisha, Tokyo (JP)

(72) Inventor: Akira Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/389,985

(22) Filed: Dec. 20, 2023

(65) Prior Publication Data

US 2024/0244145 A1 Jul. 18, 2024

(30) Foreign Application Priority Data

Jan. 16, 2023 (JP) ................................ 2023-004594

(51) Int. Cl.
 *H04N 1/00* (2006.01)
 *H04N 1/44* (2006.01)
(52) U.S. Cl.
 CPC .......... *H04N 1/00344* (2013.01); *H04N 1/44* (2013.01); *H04N 2201/0072* (2013.01); *H04N 2201/0094* (2013.01)
(58) Field of Classification Search
 CPC .......... H04N 1/00344; H04N 1/00973; H04N 1/32496; H04N 2201/0039; H04N 2201/0094; H04N 1/44; H04N 2201/0072
 USPC ...................................................... 358/1.14
 See application file for complete search history.

(56) References Cited

U.S. PATENT DOCUMENTS

| 10,057,297 | B2 | 8/2018 | Shimizu |
| 2009/0174898 | A1* | 7/2009 | Ono ...................... G06F 3/1285 358/1.15 |
| 2011/0173700 | A1* | 7/2011 | Takahashi ............... G06F 21/55 726/25 |
| 2012/0194846 | A1* | 8/2012 | Adachi .................. H04N 1/387 358/1.14 |
| 2015/0334253 | A1* | 11/2015 | Kakii ................. H04N 1/00074 358/1.14 |
| 2016/0261636 | A1* | 9/2016 | Saitoh ..................... H04L 63/20 |
| 2016/0275297 | A1* | 9/2016 | Maki ...................... G06F 3/1238 |
| 2017/0070632 | A1* | 3/2017 | Horino ............... H04N 1/00344 |
| 2020/0128146 | A1* | 4/2020 | Okamoto ........... H04N 1/00782 |
| 2020/0310704 | A1* | 10/2020 | Hanano ................. G06F 3/1204 |
| 2023/0117536 | A1* | 4/2023 | Sugiura ................. G06F 3/1238 358/1.15 |
| 2023/0195893 | A1 | 6/2023 | Ishikawa |

(Continued)

FOREIGN PATENT DOCUMENTS

JP 2016208448 A 12/2016

*Primary Examiner* — Negussie Worku
(74) *Attorney, Agent, or Firm* — Venable LLP

(57) ABSTRACT

A management system that manages a plurality of image processing devices acquires a use type corresponding to at least one of an environment in which each device is installed and a way in which the device is used from among the plurality of image processing devices, acquires setting information including a plurality of setting values from the plurality of image processing devices, and provides a report screen based on a reflection status of each setting value that may be involved in each of a plurality of threats with respect to the use type acquired from the image processing devices, for the image processing device among the plurality of image processing devices.

13 Claims, 11 Drawing Sheets

(56) References Cited

U.S. PATENT DOCUMENTS

| | | | |
|---|---|---|---|
| 2023/0254415 A1* | 8/2023 | Ishikawa | G06N 3/08 |
| | | | 358/1.13 |
| 2024/0129416 A1* | 4/2024 | Kohama | H04N 1/00602 |
| 2024/0244145 A1* | 7/2024 | Ishikawa | H04N 1/44 |

* cited by examiner

FIG. 6

601 — https://service-address/setting/security/description

Device details

602 — Device name  Printer A

603 — Installation location  A building 3F

604 — Serial No.  0000001

605 — | Company intranet | Internet prohibited | Internet direct connection | Public space | Telework | Highly confidential |

Degree of fit to threat

606 — 100%   100%   100%   100%   100%

607 —

| Setting A | Setting B | | | |
| Setting B | Setting C | Setting D | Setting D | Setting E |
| Setting F | Setting F | Setting F | Setting F | Setting F |
| Spoofing | Information leakage | DoS | Denial | Tampering |

FIG. 8

| Device name | Installation location | Serial No. | Spoofing | Information leakage | DoS | Denial | Tampering |
|---|---|---|---|---|---|---|---|
| Printer B | A building 3F | 0000002 | 66% | 50% | 50% | 50% | 50% |
| Printer C | A building 3F | 0000003 | 66% | 50% | 50% | 50% | 100% |
| Printer A | A building 3F | 0000001 | 66% | 100% | 100% | 100% | 100% |
| Printer D | A building 2F | 0000004 | 100% | 100% | 100% | 100% | 100% |
| Printer E | A building 2F | 0000005 | 100% | 100% | 100% | 100% | 100% |
| Printer F | A building 2F | 0000006 | 100% | 100% | 100% | 100% | 100% | https://service-address/setting/security/list

Device state list

MANAGEMENT SYSTEM, CONTROL METHOD OF MANAGEMENT SYSTEM, AND RECORDING MEDIUM

BACKGROUND OF THE INVENTION

Field of the Invention

The present invention relates to a management system, a control method of the management system, and a program.

Description of the Related Art

An information processing device having many functions has various settings related to security against threats including information leakage, tampering, and spoofing. The settings are, for example, a firewall function of controlling connection from a specific device and an encryption type used for network communication. In a function that enables an information processing device to be operated from a remote location, the risk of unauthorized access from a remote location occurs as a trade-off, and therefore disabling this function can also be said to be a type of security setting. Since the degree of seriousness of the security threat changes depending on the usage of the user and the use environment, the user determines the security setting of the information processing device in consideration of the convenience that constitutes a trade-off.

In general, various setting items of the security setting are grouped for each function and displayed. For example, the setting of the encryption method of the communication path to be applied during file transfer is displayed in the setting menu as a part of the setting items of the file transfer function. Similarly, the encryption method to be applied during mail transmission is displayed in the setting menu as a part of the mail function. A user who is concerned about information leak due to interception of communication contents on a communication path needs to search for a setting related to the information leak from among settings grouped for many functions and change the setting. Japanese Patent Application Laid-Open No. 2016-208448 discloses a technology of controlling related encryption design according to, for example, an instruction to prohibit a weak encryption, as means for collectively controlling scattered settings.

With the widespread use of information processing devices, the number of information processing devices in which a single administrator needs to manage, including the security status, has increased. It is difficult for the administrator to grasp various security threats that differ depending on the usage status of all of the information processing devices and to grasp whether or not there is a sufficient countermeasure status against the security threats. Additionally, when the security measures are insufficient, it is difficult to specify which setting of which information processing device is to be changed.

SUMMARY OF THE INVENTION

The present invention facilitates an administrator to grasp the setting status of a plurality of image processing devices against security threats.

A management system of the present invention comprising: a memory storing instructions; and a processor executing the instructions causing the management system to manage a plurality of image processing devices comprising: a first acquisition unit configured to acquire a use type corresponding to at least one of an environment in which each of the image processing devices is installed and a way in which the image processing device is used from among the plurality of image processing devices; a second acquisition unit configured to acquire setting information including a plurality of setting values from among the plurality of image processing devices; and a provision unit configured to provide a report screen based on a reflection status of each setting value that may be involved in each of a plurality of threats, with respect to a use type acquired from the image processing device, for an image processing device among the plurality of image processing devices.

Further features of the present invention will become apparent from the following description of exemplary embodiments with reference to the attached drawings.

BRIEF DESCRIPTION OF THE DRAWINGS

FIG. 6 is a diagram illustrating an example of a device detail screen.

FIG. 8 is a diagram illustrating an example of a device status list screen.

DESCRIPTION OF THE EMBODIMENTS

First Embodiment

Figure 1:
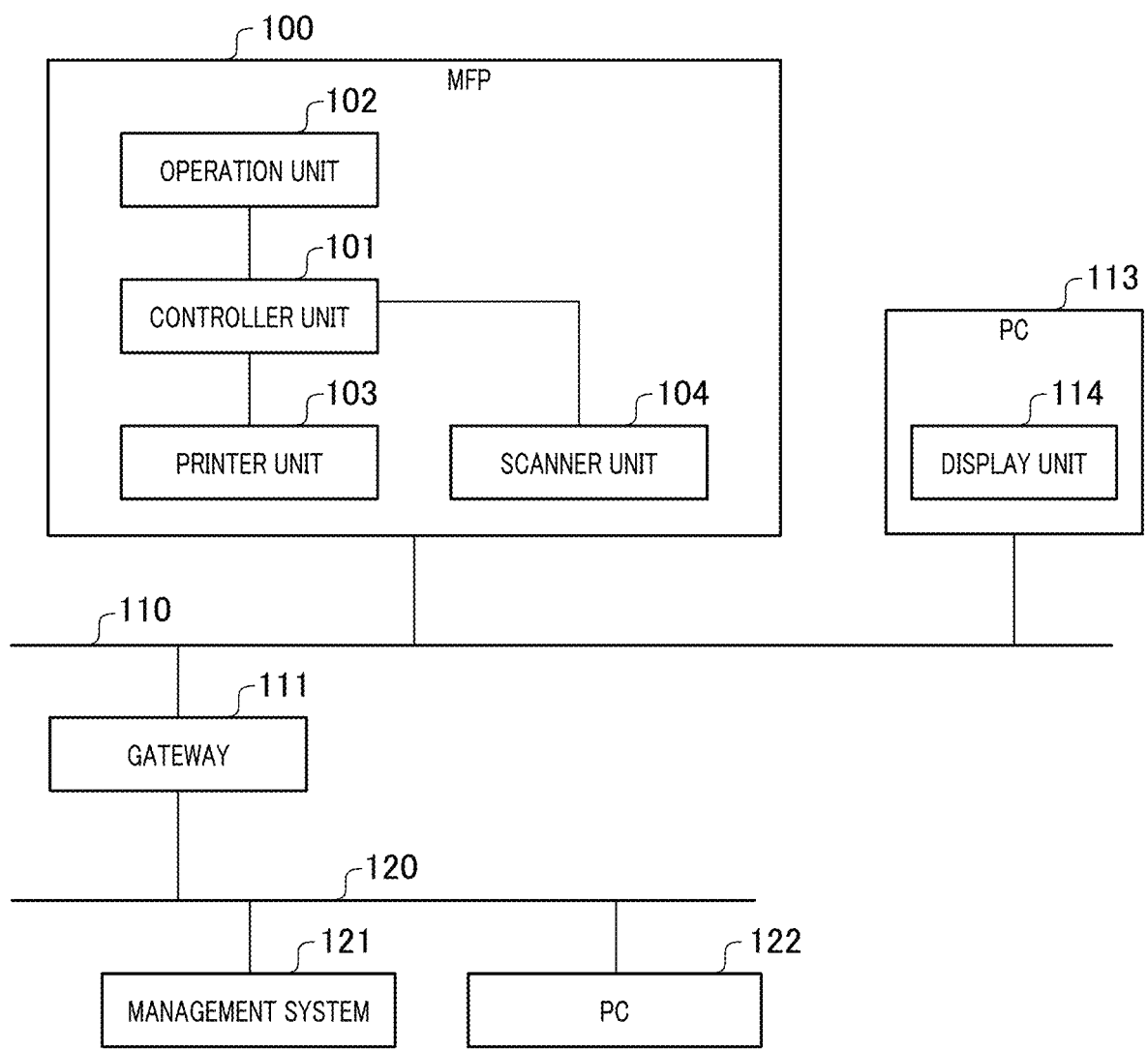
FIG. 1 is a diagram illustrating a configuration of a management system that manages an image processing device.

FIG. 1 illustrates a configuration of a system for managing an image processing device. The system that manages the image processing device includes a plurality of MFPs 100 to be managed and a management system 121 that manages the MFPs 100. The MFP 100 and the management system 121 are connected to each other via a network and can communicate with each other. Additionally, the system may further have a PC 122, a PC 113, and a gateway 111. The MFP 100 and the PC 113 are connected via a LAN 110. The management system 121 and the PC 122 are connected via the Internet 120. The LAN 110 to which the MFP 100 is connected and the Internet 120 to which the management system 121 is connected are connected via the gateway 111. Although, in the present embodiment, the MFP 100 is explained as an example of a target to be managed by the management system 121, the target to be managed by the management system 121 may be any information processing device that can communicate with the management system 121. Although an example of connection via LAN 110 and the Internet 120 will be described in the present embodiment, any type of network may be used. For example, any one of a communication network such as a WAN, a cellular network (for example, LTE, 5G, and the like), a wireless network, Wi-Fi (trademark), a phone line, a dedicated digital communication line, and the like, or a combination thereof may be used.

The Multifunction Peripheral (MFP) 100 is an image processing device including a scanner and a printer. Note that the MFP 100 may have other functions such as a facsimile function and a box function, or may not necessarily have a printer or a scanner. The MFP 100 has a controller unit 101, an operation unit 102, a printer unit 103, and a scanner unit 104. The controller unit 101 controls the entire MFP 100. Details of the controller unit 101 will be explained below with reference to FIG. 2A. The operation unit 102 receives an operation from a user and displays information to the user. The printer unit 103 outputs electronic data to a paper medium. For example, the printer unit 103 forms an image corresponding to a received print job and outputs the image to a sheet, or optically reads a document image set in the scanner unit 104 and outputs the image to a sheet. The scanner unit 104 optically reads a document set on a document table or an auto document feeder (ADF) (not illustrated) and converts the read document into electronic data. The operation unit 102, the printer unit 103, and the scanner unit 104 are connected to the controller unit 101, and realize a function as a multifunction peripheral under the control of the controller unit 101.

The management system 121 provides a service for managing a plurality of image processing devices. The management system 121 provides a service for managing a plurality of image processing devices including the MFP 100 by a cloud service or a management application. The management system 121 may be realized by one or a plurality of information processing devices such as servers, may be realized by a virtual machine (cloud service) using resources provided by a datacenter including the information processing device, or may be realized by a combination thereof.

The PC (personal computer) 113 and PC 122 are work terminals that transmit a print job to the MFP 100 and remotely operate the MFP 100. In the present embodiment, a case in which a user who is an administrator of the MFP 100 accesses the management system 121 from the PC 113 using an web browser will be explained as an example. The PC 113 has a display unit 114. Web pages such as a report screen provided on the web browser from the management system 121 is displayed on the display unit 114. Although, in the present embodiment, an example in which the report screen is displayed on the PC 113 will be explained, devices on which the report screen is displayed are not limited thereto. The report screen provided by the management system 121 may be displayed on information processing devices such as another PC and a tablet terminal, or may be displayed on the image processing devices such as the MFP 100. The gateway 111 is a network router that relays between terminals on the LNA 110 such as the MFP 100 and the Internet 120.

Figure 2A:
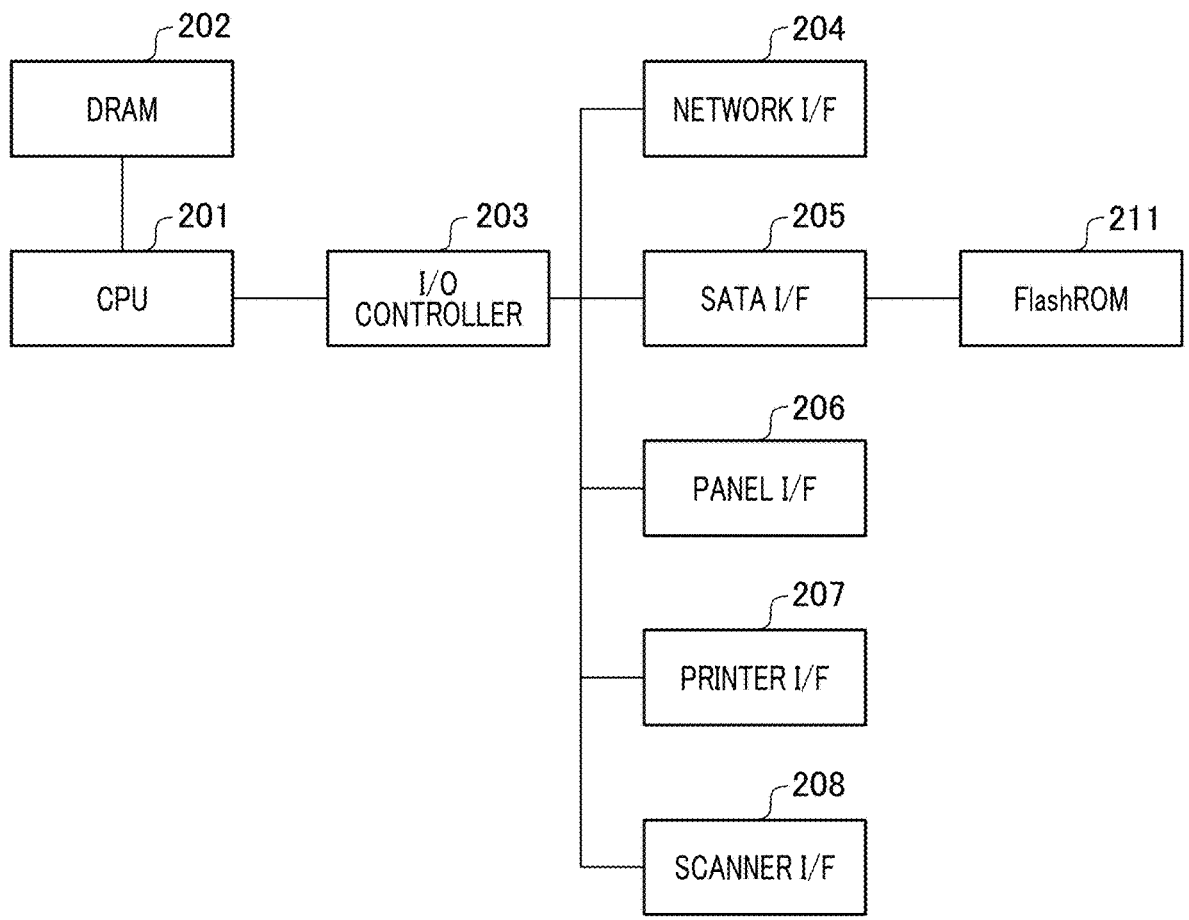
FIGS. 2A and 2B are diagrams illustrating a hardware configuration.

FIG. 2A is a diagram illustrating a hardware configuration of the controller unit 101 in the MFP 100. The controller unit 101 includes a CPU 201, a DRAM 202, an I/O controller 203, various I/Fs, a priority LAN device 210, and a FlashROM 211. The various I/Fs include a network I/F 204, a SATA I/F 205, a panel I/F 206, a printer I/F 207, and a scanner I/F 208.

The central processing unit (CPU) 201 performs calculation processing to control the entire MFP 100. The CPU 201 is connected to the DRAM 202 via a bus. The DRAM 202 is used by the CPU 201 serving as a working memory for temporarily storing program data representing an calculation instruction in the process of a calculation operation performed by the CPU 201 and data to be processed. Additionally, the CPU 201 is connected to the I/O controller 203 via the bus.

The I/O controller 203 controls input/output to and from various devices such as the operation unit 102, the printer unit 103, and the scanner unit 104, and external devices according to an instruction from the CPU 201. The I/O controller 203 is connected to the FlashROM 211 serving as a storage unit 106 via a serial advanced technology attachment (SATA) I/F 205. The CPU 201 uses the FlashROM 211 to store a program for realizing the function of the MFP 100, a document file, a reserved print job, a scanned image, and the like. Note that a large-capacity storage unit such as a hard disk drive (HDD) may be connected to the SATA I/F 205, instead of the FlashROM 211.

Additionally, the I/O controller 203 is connected to the network I/F 204, the panel I/F 206, the printer I/F 207, and the scanner I/F 208. A network such as a LAN 140 is connected to the network I/F 204. The CPU 201 realizes communication with external devices such as the management system 121 and the PC 113 connected to the network 140 via the network I/F 204 and the network. The CPU 201 realizes input/output for the user to the operation unit 102 via the panel I/F 206. The CPU 201 realizes print processing using the printer unit 103 via the printer I/F 207. The CPU 201 realizes scan processing using the scanner unit 104 via the scanner I/F 208.

Figure 2B:
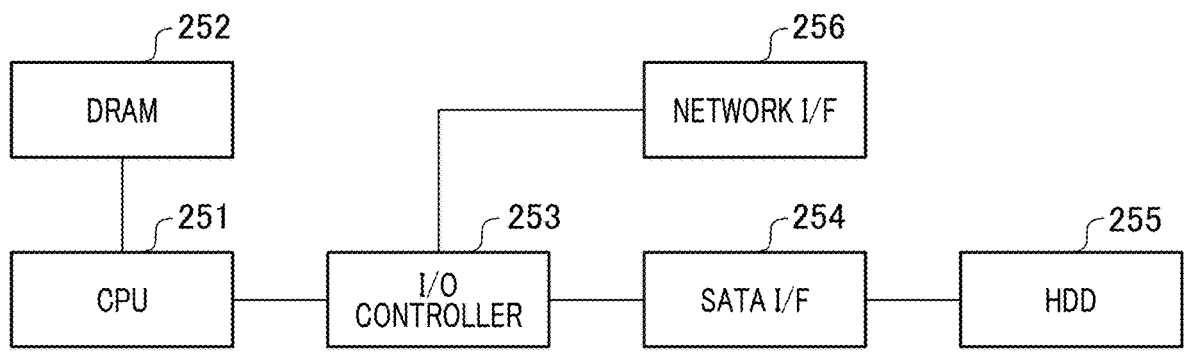

FIG. 2B is a diagram illustrating a hardware configuration of the management system 121. The management system 121 has a CPU 251, a DRAM 252, an I/O controller 253, a SATA I/F 254, an HDD 255, and network I/F 256. The CPU 251 controls the entire management system 121. The CPU 251 is connected to the DRAM 252 via a bus. The DRAM 252 is used by the CPU 251 serving as a working memory for temporarily storing a program representing a calculation instruction in the process of calculation performed by the CPU 251 and data to be processed. Additionally, the CPU 251 is connected to the I/O controller 253 via a bus.

The I/O controller 253 controls input/output to and from external devices and storage unit according to an instruction from the CPU 251. The I/O controller 253 is connected to the HDD 255 via the SATA I/F 254. The HDD 255 is an example of storage unit, and stores programs and setting values for realizing various functions of the management system 121. The I/O controller 253 is connected to the network I/F 256. The network I/F 256 is connected to the Internet 120. The CPU 251 realizes communication with external devices via the network I/F 256 and the Internet 120.

Hardware such as the CPU 251, the DRAM 252, and the HDD 255 constitutes referred to as a computer. Although, in the present embodiment, for the sake of explanation, a case in which one CPU 251 executes each process illustrated in the flowchart to be described below by using one memory (DRAM 252) is exemplified, another mode may be employed. For example, a plurality of processors, a RAM, a ROM, and a storage may cooperate with each other to execute each process illustrated in the flowchart to be described below. Additionally, a plurality of server computers may be used to execute each process. Additionally, the management system 121 can be provided to a plurality of different tenants by using containerization and virtualization technology.

Figure 3B:
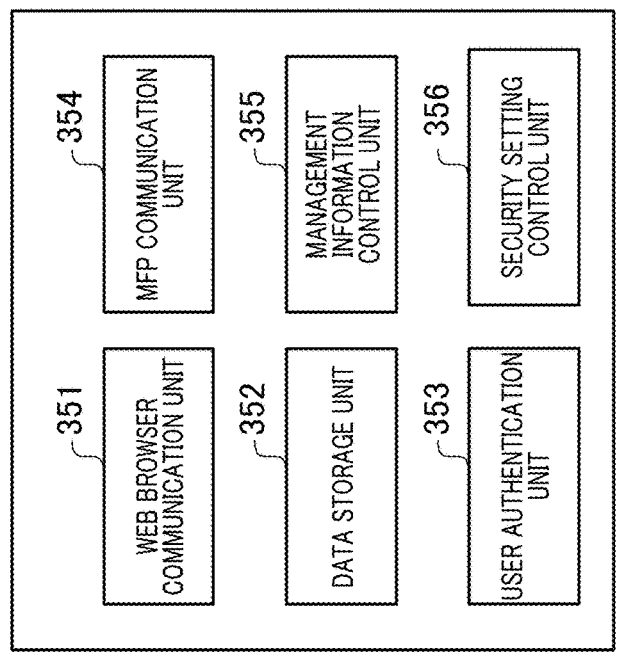
FIGS. 3A and 3B are diagrams showing software configurations.
Figure 3A:
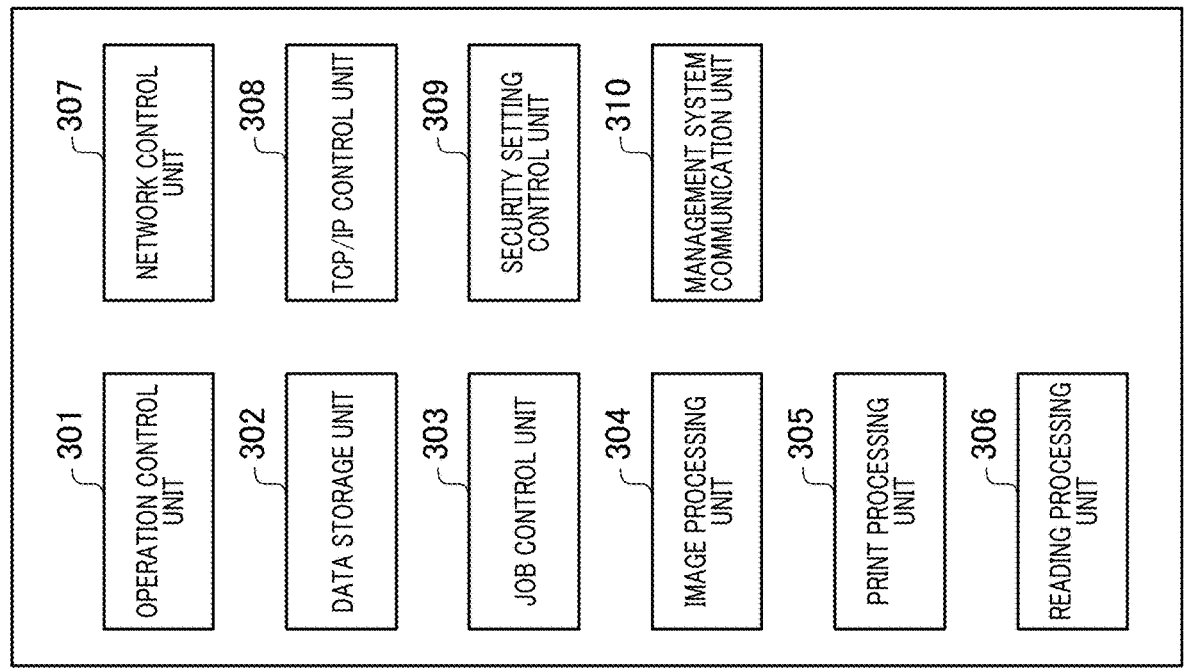

FIG. 3A is a diagram illustrating a software configuration of the MFP 100. The software configuration of the MFP 100 is realized by the CPU 201 of the controller unit 101 reading a program stored in the FlashROM 211 into the DRAM 202 and executing the program. The MFP 100 has an operation control unit 301, a data storage unit 302, a job control unit 303, an image processing unit 304, a print processing unit 305, a reading processing unit 306, and a network control unit 307. The MFP 100 further has a TCP/IP control unit 308, a security setting control unit 309, and a management system communication unit 310.

The operation control unit 301 controls display and reception of an operation in the operation unit 102. Specifically, the operation control unit 301 displays a screen image for the user on the operation unit 102. Additionally, the operation control unit 301 executes processing associated with detection of a user operation and screen components such as a button displayed on the screen. The data storage unit 302 controls recording to a FlashROM 211, which is a storage unit, and readout from the FlashROM 211. For example, when the user changes a device setting, the data storage unit 302 stores a setting value corresponding to the input of the user in the FlashROM 211, based on a request from the operation control unit 301 that has detected the content input to the operation unit 102 by the user.

The job control unit 303 controls the execution of a job. The image processing unit 304 processes image data into a format suitable for the intended use according to an instruction from the job control unit 303. The print processing unit 305 controls print processing performed by the printer unit 103. Specifically, the print processing unit 305 prints and outputs an image on a paper medium and the like via the printer I/F 207 according to an instruction from the job control unit 303. The reading processing unit 306 controls scan processing performed by the scanner unit 104. Specifically, the reading processing unit 306 reads a set document via the scanner I/F 208 according to an instruction from the job control unit 303.

The network control unit 307 controls input/output of data to and from external devices via the network I/F 204 and the LAN 110. Additionally, the data storage unit 302 can access the data stored in the FlashROM 211 from an external device via the network control unit 307. Examples of image data stored in the FlashROM 211 include PDF and JPEG. Additionally, the network control unit 307 performs network settings including an IP address and the like to the TCP/IP control unit 308 during system activation of the MFP 100 or during detection of a setting change, according to the setting value stored in the storage unit 302.

The Transmission Control Protocol/Internet Protocol (TCP/IP) control unit 308 performs transmission and reception processing of network packets via the network I/F 204. The security setting control unit 309 manages the security setting of the MFP 100. Specifically, the security setting control unit 309 specifies and manages a correspondence relation between a setting value related to security and a setting item and a correspondence relation between each setting item and a security threat, among the setting values stored in the data storage unit 302. Additionally, the security setting control unit 309 specifies and manages the correspondence relation between a usage environment and a security setting item that needs to be controlled.

The management system communication unit 310 controls communication between the management system 121 and the MFP 100. The management system communication unit 310 receives and transfers information with the management system 121 by using the network control unit 307. Specifically, the management system communication unit 310 provides a notification regarding the changed setting item and the corresponding setting value when the change of the setting is performed in the data storage unit 302 of the MFP 100 so that the management system 121 can specify the setting currently operating in the MFP 100. Additionally, when receiving an instruction regarding a setting change from the management system 121, the management system communication unit 310 instructs to perform processing of changing the setting value stored in the data storage unit 302 according to the instruction from the management system 121. Thus, the MFP 100 and the management system 121 can bidirectionally synchronize the information on the MFP 100, and the management system 121 can confirm and change the information on the MFP 100 in real time.

FIG. 3B is a diagram showing a software configuration of the management system 121. The software configuration of the management system 121 is realized by the CPU 251 reading a program stored in the HDD 255 into the DRAM 252 and executing the program. The management system 121 has a web browser communication unit 351, a data storage unit 352, a user authentication unit 353, an MFP communication unit 354, a management information control unit 355, and a security setting control unit 356.

The web browser communication unit 351 provides a screen for the user as web page on the web browser in response to a request from the web browser operating on the PC 113. Additionally, the web browser communication unit 351 receives a user operation on a screen that is displayed on the web browser. Specifically, the web browser communication unit 351 detects a user operation on a screen component such as a button displayed on the screen and instructs each unit to execute processing associated with the screen component.

The data storage unit 352 controls recording to a HDD 255, which is a storage unit, and controls readout from the HDD 255. For example, when a user changes a device setting, the data storage unit 352 stores a setting value corresponding to the input of the user in the HDD 255, based on a request from the web browser communication unit 351 that has detected the content input by the user via a screen. The user authentication unit 353 performs authentication of a user. For example, the user authentication unit 353 performs authentication of a user who uses the management system 121 by using authentication information acquired from the user via the web browser communication unit 351 and account information stored in the data storage unit 352. Note that the authentication method is not limited thereto, and authentication may be performed by another method, for example, biometrics authentication and authentication using an authentication server.

The MFP communication unit 354 controls communication with the MFP 100. For example, the MFP communication unit 354 functions as a first acquisition unit that acquires, from the MFP 100, a use type corresponding to an installation environment of the MFP 100 and a way in which the MFP 100 is used, and the like. Additionally, the MFP communication unit 354 functions as a second acquisition unit that acquires setting information including a setting value of the MFP 100. The MFP communication unit 354 can also transmit an instruction to change the setting value to the MFP 100.

The management information control unit 355 generates the content of the management information of the image processing device to be provided to the user via the web browser communication unit 351. For example, when a screen showing that the security-related setting is not changed from the default setting is displayed to the user, the management information control unit 355 processes the data stored in the data storage unit 352 to generate appropriate display information. In the present embodiment, the management information control unit 355 generates a report screen to be displayed to the user based on the information acquired from the image processing device stored in the data storage unit 352 and the analysis result obtained by the security setting control unit 356.

The security setting control unit 356 manages the security setting of the image processing device to be managed. In order to manage the security setting of the image processing device, the security setting control unit 356 analyzes the information on the use type and the security setting that has been acquired from the plurality of image processing devices to be managed and stores the analyzed result in the data storage unit 352. Specifically, the security setting control unit 356 specifies and manages the item related to the security corresponding to the setting value of the MFP 100 and the security threat corresponding to the item of the security setting. Additionally, the security setting control unit 356 specifies and manages the use type such as a use environment and a way in which the MFP 100 is used in which the security threat is likely to be actualized. Definition information for specification is stored in advance in the data storage unit 352, and the security setting control unit 356 extracts the definition information from the data storage unit 352 and uses the definition information.

Figure 4:
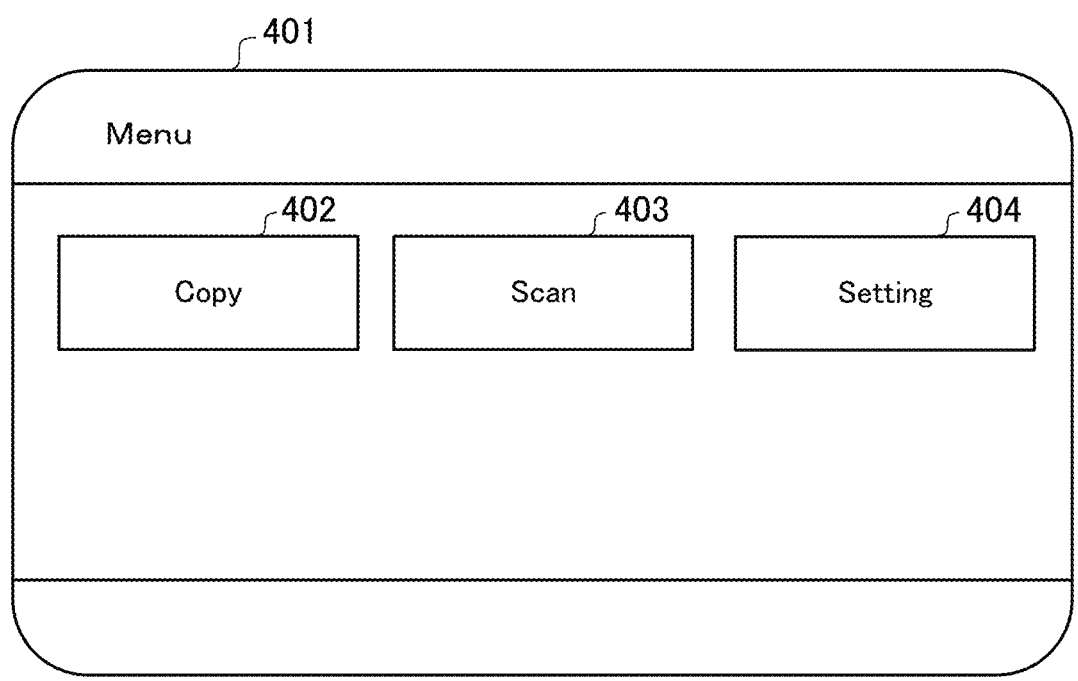
FIG. 4 is a diagram showing an example of a menu screen.

FIG. 4 is a diagram showing an example of a menu screen. A menu screen 401 is displayed on the operation unit 102 of the MFP 100 by the operation control unit 301. For example, a copy button 402, a scan button 403, and a setting button 404 are displayed on the menu screen 401. The copy button 402 is a button for executing printing. The scan button 403 is a button for executing scanning. The setting button 404 is a button for performing the setting of the MFP 100. The user selects one of the buttons to execute a corresponding function.

Figure 5:
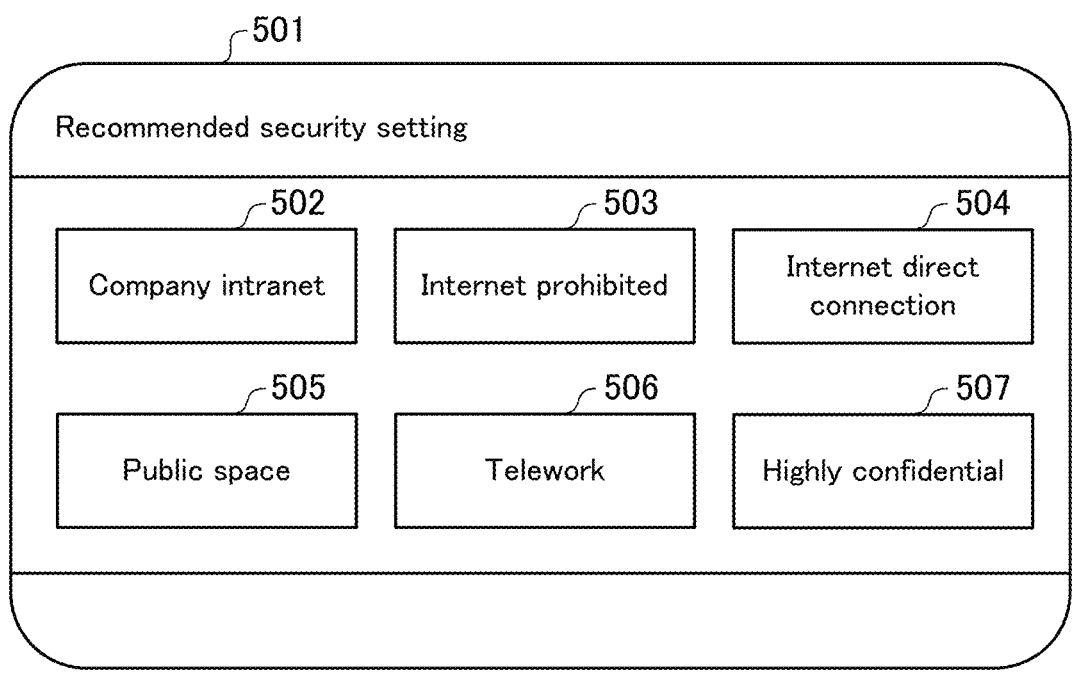
FIG. 5 is a diagram showing an example of a recommended security setting screen.

FIG. 5 is a diagram showing an example of a recommended security setting screen. A recommended security setting screen 501 is a screen displayed by selecting a recommended setting menu from a setting menu displayed after the setting button 404 is pressed and is displayed on the operation unit 102 of the MFP 100 by the operation control unit 301. The user can collectively apply the security setting corresponding to the use type to the MFP 100 by selecting the use type of the MFP 100 on the recommended security setting screen 501.

As the use type, a plurality of types is defined in advance by a vendor based on a setting environment of the network devices, a use environment of the network device, whether or not confidential information is included in information expected to be used in the image processing device, and the like. As the use type, for example, a company intranet environment, an Internet prohibited environment, an Internet direct-connection environment, a public space environment, a telework environment, a highly confidential information management environment, and the like can be assumed. The administrator of the network device selects one type to be set in the image processing device from a plurality of types that becomes options of the use type of the image processing device defined by the vendor. The security setting to be set in the image processing device is different for each use type. For example, the file sharing function is a function of sharing a file on a network within an environment, and it is desirable to disable the sharing function in an environment in which an unspecified user shares the network in the environment in order to prevent the leakage of information. That is, it is recommended that the file sharing function be disabled except for private network environments where a specific user shares a network within the environment. The private network environment in the present embodiment includes a company intranet environment, an internet prohibited environment, and a telework environment. Therefore, in Internet-connected environments, public space environments and highly sensitive information management environments except for these environments, it is recommended that the file sharing function be disabled. An example of the setting related to the file sharing function is a server message block (SMB) server setting. The definition of the use type as described above does not limit the present invention, and a part or another use type exemplified in the present embodiment may be defined. For example, the use type may be classified for each type of industry such as finance or government office on the assumption that the image processing device is installed in a company.

A use environment company intranet button 502 is a button for collectively setting a series of security settings that are appropriate in a case in which the use environment is a company intranet. A use environment internet prohibition button 503 is a button for collectively setting a series of security settings appropriate in a case in which the use environment is the internet prohibition. A use environment internet direct connection button 504 is a button for collectively setting a series of security settings that are appropriate in a case in which the use environment is directly connected to the Internet. A use environment public space button 505 is a button for collectively setting a series of security settings that are appropriate in a case in which the use environment is public space. A use environment telework button 506 is a button for collectively setting a series of security settings that are appropriate in a case in which the use environment is telework or the like and a connection is made to a specific network. A use environment highly confidential button 507 is a button for collectively setting a series of security settings that are appropriate in a case in which the use environment is an environment that handles highly confidential information.

When the user selects each button corresponding to the use environment displayed on the recommended security setting screen 501, the operation control unit 301 of the MFP 100 detects the user's selection, and the storage unit 302 records the setting value of the use environment of the MFP 100 that has been selected by the user. For example, when the use environment company intranet button 502 is selected, a setting value (use environment setting value) indicating information indicating that the use environment of the MFP 100 is a company intranet is recorded in the storage unit 302. Note that the setting of each item of the setting collectively set here can be individually changed on a setting screen (not illustrated).

Figure 7:
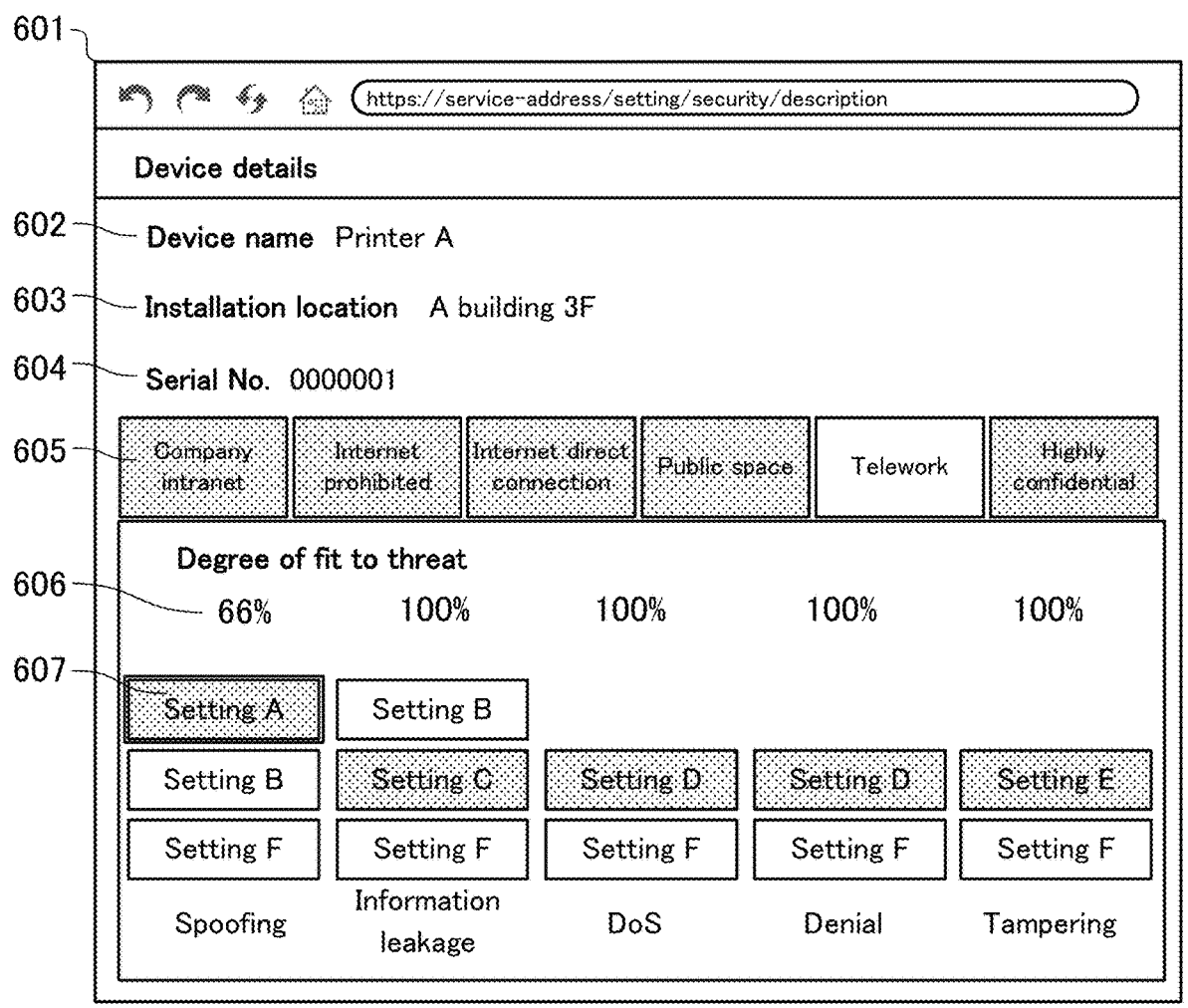
FIG. 7 is a diagram illustrating an example of the device detail screen.

In the present embodiment, the management system 121 provides the administrator with a report screen based on the reflection status of each setting value that may be involved in each of a plurality of threats, with respect to the use type acquired from the image processing device to be managed. A report screen related to the security setting of the devices managed by the administrator using the management system 121, which is provided as a web page to the web browser by the management system 121, will be described with reference to FIG. 6 to FIG. 9B. FIG. 6 and FIG. 7 are diagrams illustrating examples of the device detail screen. A device detail screen 601 is a screen for displaying detailed information of the MFP 100 provided by the management system 121 and is displayed on the web browser that operates in the PC 113. The administrator of the MFP 100 transmits a request for displaying the details of the PC 113 to the management system 121 via the web browser of the MFP 100, and the management system 121 provides the device detail screen 601 generated based on the information of the MFP 100, whereby the device detail screen 601 is displayed on the web browser.

On the device detail screen 601, for example, a device name display region 602, an installation location display region 603, a serial number region 604, and security settings are displayed. In the security setting of the device detail screen 601, for example, a use environment specification tab 605, a fit degree display region 606, and a security setting display region 607 are displayed. In the device name display region 602, information on a device name corresponding to the MFP 100 to be displayed is displayed. Information on the device name is recorded in advance in the data storage unit 352 by the user. In the installation location display region 603, information on an installation location corresponding to the MFP 100 to be displayed is displayed. The information on the installation location is recorded in advance in the data storage unit 352 by the user. In the serial number region 604, information on a serial number corresponding to the MFP 100 to be displayed is displayed. The information on the serial number is recorded in advance in the data storage unit 352 by the user. The device name information and the serial number information may be acquired by the MFP communication unit 354 from the MFP 100 and stored in the data storage unit 352.

The use environment specification tab 605 is a tab for switching the use environment corresponding to the display contents displayed in the fit degree display region 606 and the security setting display region 607. In the initial display of the use environment specification tab 605, the use environment selected on the recommended security setting screen 501 is preferably displayed. Additionally, in order to emphasize which use environment is selected on the recommended security setting screen 501, the display of the corresponding use environment may be highlighted in the use environment specification tab 605. FIG. 6 shows a case in which the company intranet is specified in the use environment specification tab 605. FIG. 7 shows a case in which "telework" is specified in the use environment specification tab 605. When the use environment is specified in the use environment specification tab 605, the setting state of the specified use environment is displayed, and the user can confirm the setting status for various use environments.

The fit degree display region 606 is a region for displaying how the degree to which the current setting value fits to the recommended setting value for each threat in the use environment specified in the use environment specification tab 605. That is, in the fit degree display region 606, the degree of fit of the reflection status indicating the ratio of the setting value reflected in the image processing device to the setting value recommended for each setting item according to the use type of the image processing device is displayed for each of the plurality of threats. Although, in the present embodiment, five types of threats, that is, spoofing, information leak, DoS, denial, and tampering are described as examples, the threats are not limited to these. DoS is an abbreviation for "Denial of Service". For example, the degree of fit in the setting A of the spoofing of the company intranet environment as shown in FIG. 6 is 100%, and the degree of fit in the setting A of the spoofing of the telework environment as shown in FIG. 7 is 66%. Even in the same setting status, the setting item that may be involved in the threat, that is, the recommended setting item is different for each use environment, and as a result, the degree of fit to the use environment is different, and therefore, the degree of fit is different in FIG. 6 and FIG. 7. By checking the display of the fit degree display region 606, the user can intuitively grasp whether or not the setting is sufficient for each threat in the specified use environment by the numerical value.

The security setting display region 607 is a region in which the security settings of the MFP 100 are classified and displayed for each threat. For a security threat, the setting item of security that can be set for each security threat in the security setting of the MFP 100 is presented, and whether or not each security setting item is enabled by the setting value is presented. That is, the security setting display region 607 indicates the reflection status of the setting value for each setting item of the image processing device for each of a plurality of threats corresponding to the use type of the image processing device. Furthermore, in a case in which the setting value of the recommended setting item is not enabled, the recommended setting item may be displayed with highlighting.

The setting A to the setting F are buttons indicating the security setting that can be set for each threat, and an item for which the setting is enabled and an item for which the setting is disabled are displayed in different display colors. The user can visually grasp whether or not the corresponding security setting is enabled by checking the color of the button. Although, in the examples of FIG. 6 and FIG. 7, a case in which white color is enabled and a case in which gray color is disabled are shown, other colors may be used to indicate enabled/disabled. Since the same security setting may correspond to a plurality of threats, the same security setting may be classified into a plurality of security threats in an overlapping manner, such as the setting B, the setting D, and the setting F. Additionally, the user can change the enabled state of the setting by pressing a button. Note that after another screen is opened by pressing a button, the setting change instruction may be received on the screen.

The setting A classified as spoofing in FIG. 6 is displayed in gray, indicating that the setting is in a disabled state. The setting A classified as spoofing in FIG. 7 is also displayed in gray to indicate that the setting is in a disabled state, however, unlike the display in FIG. 6, the frame of the setting button is highlighted with a double line. The highlighted display indicates that the setting A is a recommended setting in the telework environment. Specifically, the setting A is a setting that is not recommended in the company intranet environment and a setting that is recommended in the telework environment, and the setting change of the setting A is induced by highlighting the setting A only in the telework environment. As described above, in the present embodiment, if the recommended security setting is disabled, the setting is highlighted to prompt the user to change the setting to enabled. Note that since the setting B is in the enabled state, the setting B is not highlighted even if it is a recommended setting. However, the setting in the enabled state may also be highlighted. Note that the highlighting method is not limited to the method of making the frame double-lined, and any method such as blinking or display in a specific color may be used.

FIG. 8 is a diagram illustrating an example of a device status list screen. A device status list screen 801 is a screen in which a list of statuses of devices provided by the management system 121 is displayed and is displayed on the web browser operating in the PC 113. The administrator of the MFP 100 transmits a device status list display request to the management system 121 via the web browser of the PC 113 and provides the device status list screen 801 generated based on the information that the management system 121 manages, thereby the device status list screen 801 is displayed on the web browser.

A device status list display region 802 is displayed on the device status list screen 801. The device status list display region 802 is a region in which the degree of fit of the reflection status of each setting value of each image processing device for each of a plurality of threats is displayed in list, according to the use type of each of the plurality of image processing devices managed by the administrator using the management system 121. In the device status list display region 802, device information for specifying which image processing device the information belongs to, and the degree of fit of the security setting of each device to the security threat are displayed.

In the device status list display region 802, for example, a device name, an installation location, and a serial number are displayed as information for specifying which image processing device the information belongs to. The device name, the installation location, and the serial number displayed in the device status list display region 802 are the same information as the information displayed in the device name display region 602, the installation location display region 603, and the serial number region 604 of the device detail screen 601. Device information for specifying these devices is recorded in the data storage unit 352.

In the device status list display region 802, as information indicating the security status of the use type of each image processing device, the degree of fit to five security threats, that is, spoofing, information leak, DoS, denial, and tampering is displayed. The degree of fit to each security threat displayed in the device status list display region 802 is the same information as the information displayed in the fit degree display region 606 of the device detail screen 601.

The information displayed in the device status list display region 802 is displayed in a different display color for each image processing device, according to the degree of fit of the reflection status of each setting value of each image processing device to the security threat. For example, the background color, which is the display color, is determined by the number of threats having the degree of fit of 100% among the five threats. If all of the five threats have the degree of fit of 100%, for example, white that does not represent the meaning of warning is used as in the printers D to F. If only one of the threats does not have the degree of fit of 100%, for example, as in the printer A, a background color, for example, light yellow that slightly indicates the meaning of the warning is used. If there is only one threat having the degree of fit of 100%, for example, as in the printer C, a background color such as light red that strongly indicates the meaning of the warning is used. If there are no threats having the degree of fit of 100%, for example, as in the printer B, a background color such as dark red that indicates the meaning of the strongest warning is used. Additionally, the order of display may be determined according to the degree of fit of the security setting to the threat. The administrator can immediately recognize an image processing device that requires a countermeasure against a security threat, for example, by performing the displaying in order in which the number of settings with the degree of fit of 100% is lower. Thus, the administrator can recognize at a glance an image processing device for which a countermeasure against the security threat is necessary by changing the display background color for each device according to the degree of fit of the current security setting to the threat, even in a case in which many image processing devices are managed.

Figure 9A:
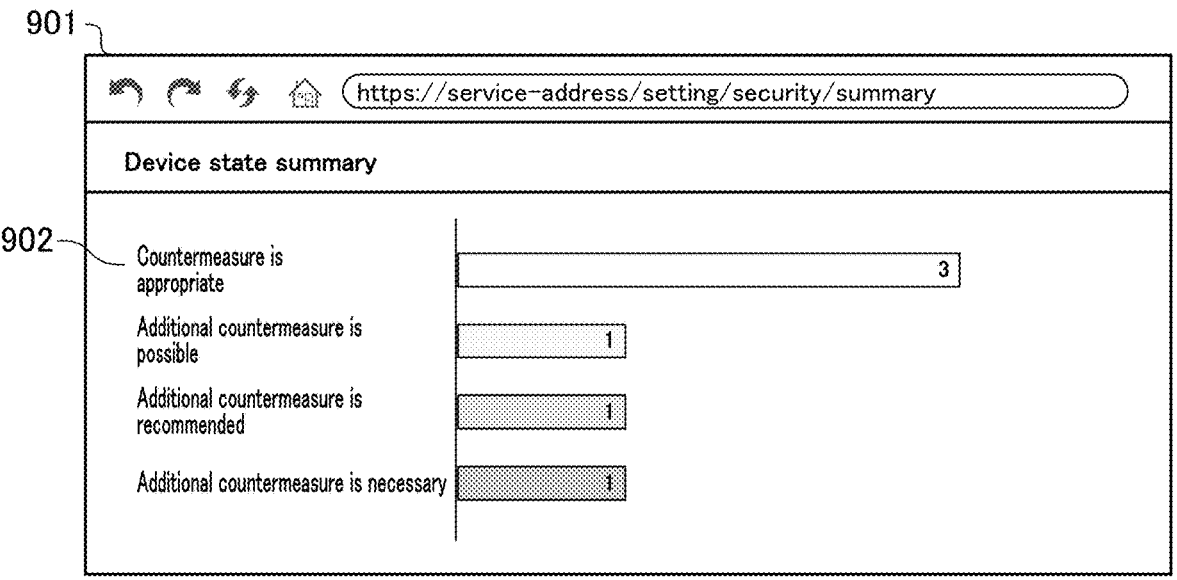
FIGS. 9A and 9B are diagrams illustrating an example of a device status summary screen.
Figure 9B:
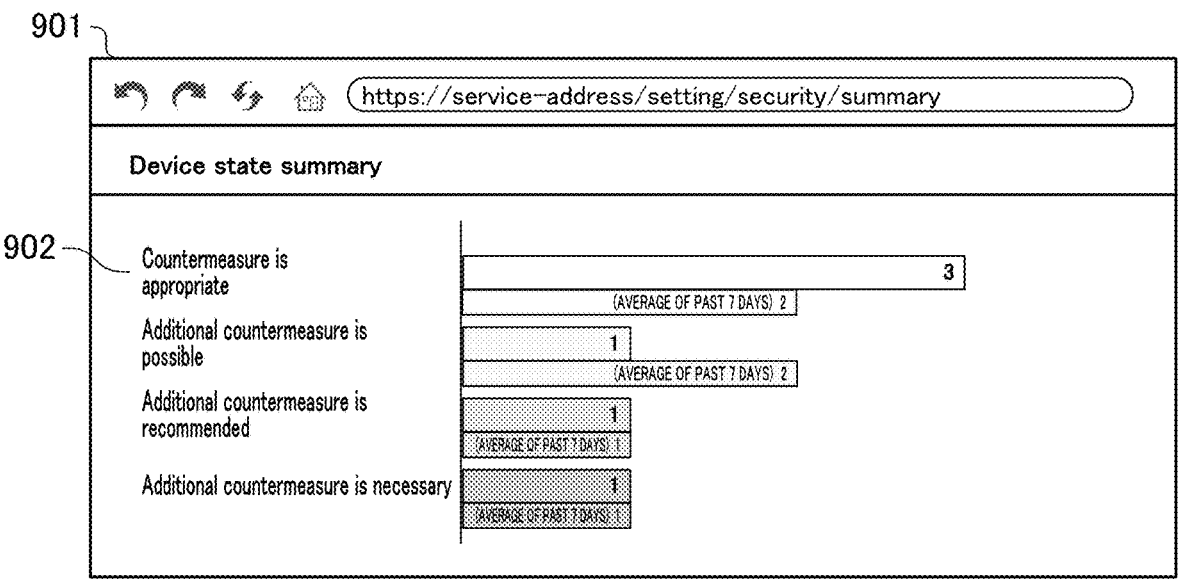

FIGS. 9A and 9B is a diagram illustrating an example of the device status summary screen. A device status summary screen 901 is a screen for displaying a summary of information on a plurality of image processing devices managed by the administrator, which is provided by the management system 121, and is displayed on the web browser that operates in the PC 113. The administrator transmits a device status summary screen display request to the management system 121 via the web browser of the PC 113, and the device status summary screen 901 generated based on the information managed by the management system 121 is provided and displayed on the web browser.

A device status summary display region 902 is displayed on the device status summary screen 901. The device status summary display region 902 is a region in which a summary of information on a plurality of image processing devices managed by the administrator using the management system 121 is displayed. In the present embodiment, as the summary, the number of image processing devices classified according to the necessity of changing the setting value in each image processing device so that a recommended setting value is set according to the use type of each image processing device for a plurality of image processing devices managed by the administrator. A result obtained by classifying and aggregating a plurality of image processing devices to be managed according to the necessity of improvement of the security setting is displayed in the device status summary display region 902. In the present embodiment, for example, an example will be explained in which the number of image processing devices is displayed by a graph and a numerical value for each of four classifications of "countermeasure is appropriate", "additional countermeasure is possible", "additional countermeasure is recommended", and "additional countermeasure is necessary". The device classified as "countermeasure is appropriate" is a device in which the degree of fit of the security settings to the five security threats are all 100%. A device classified as "additional countermeasure is possible" is a device in which only one of the degree of fit of the security settings to the five security threats is not 100%. The device classified into "additional countermeasure is recommended" is a device in which only one of the degree of fit of the security settings to the five security threats is 100%. A device classified as "additional countermeasure is necessary" is a device for which none of the degree of fit of the security settings to the five security threats is 100%.

FIG. 9A illustrates an example in which the device status summary screen 901 is displayed based on the current security setting. FIG. 9B illustrates an example in which, in addition to the summary display based on the current security setting as shown in FIG. 9A, a past total value is displayed as auxiliary information on the device status summary screen 901. In the present embodiment, as the auxiliary information, the average number of devices in the past seven days for the total value in each classification is displayed. The period time for aggregating the auxiliary information may be the past one month or one day, and the auxiliary information may be the number of devices at a certain time point in the past instead of the average value.

In order to cause the web browser operating in the PC 113 to display the report screens as shown in FIG. 6 to FIG. 9B, the management system 121 performs the processing of acquiring a setting value from the MFP 100, analyzing setting value information, and providing a screen based on the setting value information in response to a display request from the PC 113. The processing that is executed in the MFP 100 for the management system 121 to acquire a setting value from the MFP 100 will be described with reference to FIG. 10. Additionally, the processing in which the management system 121 that has acquired the set value from the MFP 100 analyzes the set value and stores information used to provide a report screen will be explained with reference to FIG. 11.

Figure 10:
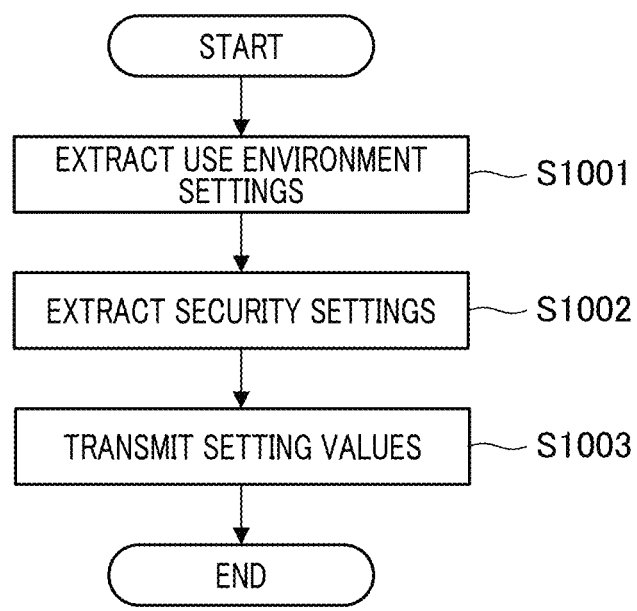
FIG. 10 is a flowchart showing the processing executed by an MFP 100.

FIG. 10 is a flowchart showing the processing executed by the MFP 100. Each processing performed by the MFP 100 in FIG. 10 is executed as the calculation processing of the CPU 201 after the program recorded in the FlashROM 211 is read into the DRAM 202. The processes as shown in FIG. 10 starts when the MFP 100 changes the setting value in response to a user instruction. A case in which the MFP 100 changes the setting value is, for example, a case in which the security setting is collectively set on the recommended security setting screen 501, or a case in which the user instructs a change in the setting on an individual setting screen (not illustrated).

In S1001, the security setting control unit 309 of MFP 100 extracts the usage environment setting value indicating the usage type of the MFP 100. In the MFP 100, the use environment selected by the user on the recommended security setting screen 501 is recorded in the data storage unit 302 as the setting value of the use environment (use environment setting value). Accordingly, the security setting control unit 309 reads out the saved use environment setting value from the data storage unit 302.

In S1002, the security setting control unit 309 in the MFP 100 extracts the setting information of the MFP 100 including the security setting item and the setting value thereof. In the MFP 100, a plurality of setting values for various security settings selected by the user via the recommended security setting screen 501 or an individual setting screen (not illustrated) are recorded in the data storage unit 302. Accordingly, the security setting control unit 309 reads out a plurality of setting values including the stored security setting value from the data storage unit 302 as the setting information of the MFP 100.

In S1003, the security setting control unit 309 in the MFP 100 transmits the setting values extracted in S1001 and S1002 to the management system 121 via the management system communication unit 310. That is, the MFP 100 transmits a plurality of pieces of setting information including information on the use type of the MFP 100 and the security setting of the MFP 100 to the management system 121. In the transmission in S1003, the transmission is performed in association with the serial number of the MFP 100 held in advance in the data storage unit 302 so that the MFP 100 serving as the transmission source can be identified in the management system 121. Through the processes as described above, the management system 121 can acquire, from the MFP 100, the setting information including the use type of the MFP 100 corresponding to at least one of the environment in which the MFP 100 is installed and the way in which the MFP 100 is used, and a plurality of setting values of the MFP 100. Similarly, the management system 121 acquires the use type and the setting information from the plurality of devices to be managed every time the security setting is updated, similarly to the MFP 100. Then, the management system 121 stores the use type and the setting information acquired from the plurality of devices to be managed in the data storage unit 352.

Figure 11:
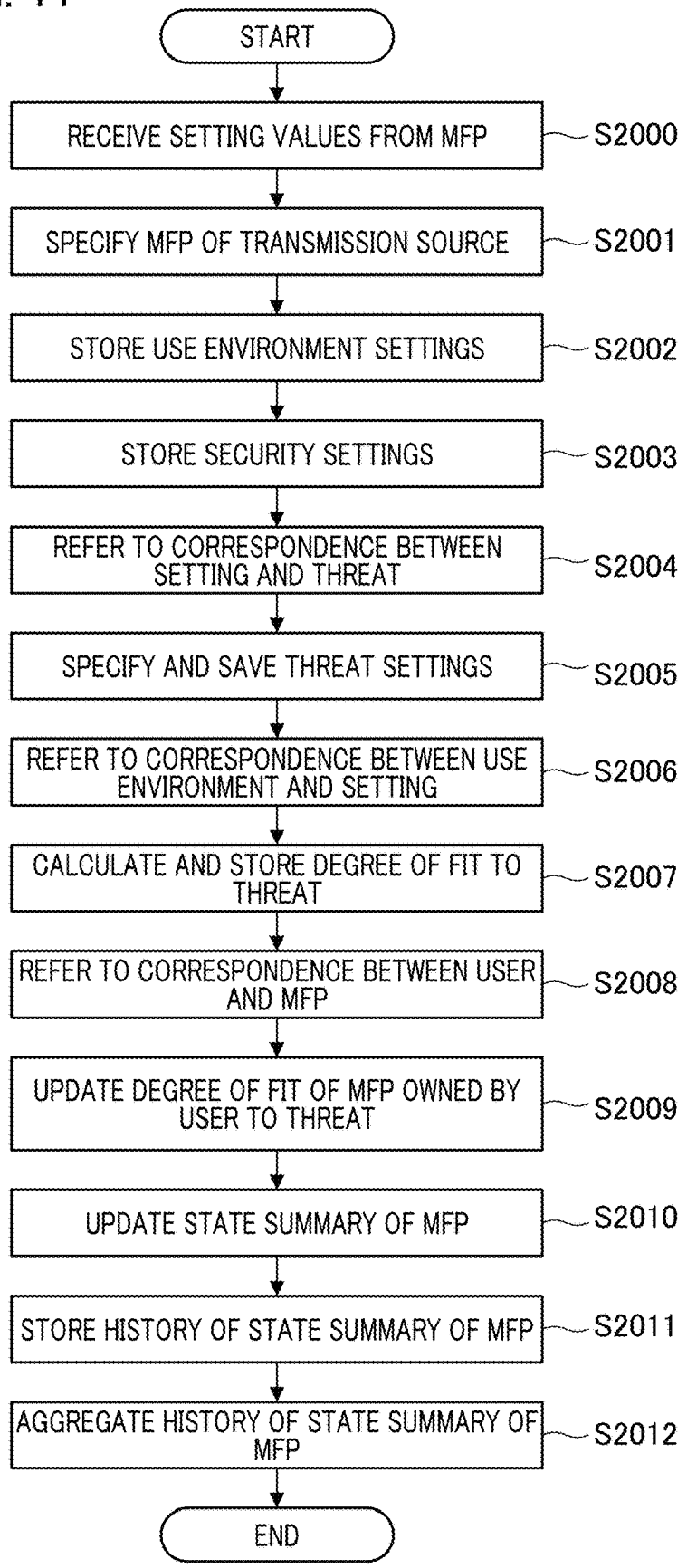
FIG. 11 is a flowchart showing the processing executed by a management system 121.

FIG. 11 is a flowchart showing the processing executed by a management system 121. Each process performed by the management system 121 in FIG. 11 is executed as the calculation processing of the CPU 251 after a program recorded in the HDD 255 is read into the DRAM 252. The process in FIG. 11 starts by receiving the use type and the setting information from the device to be managed. In the present embodiment, a case in which the transmission processing in S1003 of FIG. 10 is received from the MFP 100 will be explained as an example.

In S2000, the MFP communication unit 354 of the management system 121 acquires the setting information including the use type of the MFP 100 and the setting value of security and the serial number of the MFP 100 associated therewith from the MFP 100 that is the device to be managed. The MFP communication unit 354 receives the use type and the setting information transmitted from the MFP 100 to acquire these pieces of information.

In S2001, the security setting control unit 356 of the management system 121 specifies the device that is the transmission source of the information acquired in S2000. The security setting control unit 356 specifies the devices that are the transmission sources by extracting the serial numbers of the device that is the transmission sources associated with the information acquired in S2000. In the present embodiment, the management system 121 specifies the MFP 100 as the transmission source from the serial number of the MFP 100 associated with the information acquired in S2000.

In S2002, the security setting control unit 356 of the management system 121 stores the use type of the MFP 100 received in S2000 in the data storage unit 352. Specifically, the security setting control unit 356 records the setting value of the use environment setting included in the received data in the data storage unit 352 in association with the serial number of the MFP 100 specified in S2001. In S2003, the security setting control unit 356 of the management system 121 stores the setting information including the security setting value of the MFP 100 received in S2000 in the data storage unit 352. Specifically, the security setting control unit 356 records a plurality of setting values including the setting values of the plurality of security settings included in the received data in the data storage unit 352 in association with the serial number of the MFP 100 specified in S2001.

In S2004, the security setting control unit 356 of the management system 121 refers to the correspondence between the setting and the threat. The security setting control unit 356 retrieves the correspondence table between settings and threats indicating the security threats corresponding to each of the security setting items from the data storage unit 352 and refers to the table. Table 1 shows an excerpt of the table of correspondence between settings and threats. In the correspondence table between settings and threats, security threats associated with threats are defined in advance. For example, it is indicated that the setting of the card authentication is a setting corresponding to the threat of spoofing. Although, in the excerpt of Table 1, only the three settings of the card authentication, the password authentication, and the multi-factor authentication are exemplified, in practice, a list of several tens of rows in which all the security-related settings are defined as a list is formed.

TABLE 1

| SETTING ITEM | THREAT |
|---|---|
| CARD AUTHENTICATION | SPOOFING |
| PASSWORD AUTHENTICATION | SPOOFING |
| MULTI-FACTOR AUTHENTICATION | SPOOFING |

In S2005, the security setting control unit 356 of the management system 121 specifies the security setting information of the MFP 100 corresponding to the threat and stores the security setting information in the data storage unit 352. The security setting control unit 356 classifies the security setting information stored in S2003 for each threat based on the correspondence table referred to in S2004, and stores the classified security setting information in the data storage unit 352. The setting information including the security setting items and the setting values thereof classified and stored for each threat is used when the items to be displayed in the security setting display region 607 is determined.

In S2006, the security setting control unit 356 of the management system 121 refers to the correspondence between the use types of the devices and the settings. Specifically, the security setting control unit 356 retrieves the recommended security setting value corresponding to the use type of the device from the data storage unit 352 and refers to the recommended security setting value. Table 2 shows an excerpt of a correspondence table between the use type and the setting. In the correspondence table between the use type and the setting, settings and values to be recommended for the use type of the device are defined in advance. Since the setting to be controlled differs depending on the use type, only the setting to be controlled for each use type is defined in the correspondence table between the use type and the setting. Although, in the excerpt of Table 2, only three settings of the card authentication, the password authentication, and the multi-factor authentication are exemplified for only two environments of the company intranet and telework, in actuality, a list of several hundred rows in which all security-related settings are defined as a list for all six environments is provided. The correspondence relation between the use type and the setting of the MFP 100 referred to here is used to determine whether or not to the setting value recommended for each use type in the security setting display region 607 is displayed with highlighting.

TABLE 2

| USE TYPE | SETTING ITEM | KEY |
|---|---|---|
| COMPANY INTRANET | CARD AUTHENTICATION | ON |
| COMPANY INTRANET | PASSWORD AUTHENTICATION | ON |
| TELEWORK | CARD AUTHENTICATION | ON |
| TELEWORK | PASSWORD AUTHENTICATION | ON |
| TELEWORK | MULTI-FACTOR AUTHENTICATION | ON |

In S2007, the security setting control unit 356 of the management system 121 calculates the degree of fit to the security threat for the current setting in the MFP 100, and stores the degree of fit in the data storage unit 352. The degree of fit is specified as 100% if all recommended settings are met. For each threat, there may be a case in which a setting other than those recommended for the selected usage type is present. In this case, settings other than the recommended settings are not used to calculate the degree of fit. Thus, the degree of fit does not exceed 100%. Here, the threat of spoofing will be explained by taking, as an example, a case in which two of the card authentications and the password authentication are set to ON in a case in which the use type of the MFP 100 is telework. In the case in which the use type is telework, according to the correspondence table (Table 2) between the use type and the setting, it is recommended three settings of the card authentication, the password authentication, and the multi-factor authentication are enabled. From among the three settings for the security threat of spoofing, two of card authentication and password authentication are set to ON in the MFP 100. That is, since two of the three recommended settings are applied in the MFP 100, the security setting control unit 356 specifies the degree of fit of the security setting to the threat of spoofing in the MFP 100 as 66%. Since there are six types of use types and five types of security threats, the calculation of the degree of fit and the storage of the result are performed for all the use types and all the security threats. The degree of fit stored here is used to determine the content to be displayed in the fit degree display region 606.

In S2008, the security setting control unit 356 of the management system 121 refers to the correspondence between the devices and the users who are the administrators of the devices specified in S2001, and specifies the devices managed by the users. Specifically, the security setting control unit 356 reads out information defining the correspondence relation between administrators of the MFP 100 and devices from the data storage unit 352. In S2009, the security setting control unit 356 of the management system 121 calculates the degree of fit of the devices managed by the user to the threats and stores the calculated degree of fit in the data storage unit 352. Specifically, first, the security setting control unit 356 generates a list of devices managed by the user based on the information on the devices to be managed specified in S2008. Then, the information on the degree of fit calculated in S2007 is associated with each of the devices in the list and stored in data storage unit 352. The stored list of the degree of fit for each device is used to determine the content to be displayed in the device status list display region 802. Since the user is specified by the user authentication performed by the user authentication unit 353 prior to the display of the device status list display region 802, only the information on the device managed by the user who has requested the display is displayed. Note that the switching of the background color in the device status list display region 802 according to the degree of fit to a security threat may be performed as a process on the web browser side that is executed by the PC 113, or the screen may be provided after the management system 121 sets the background color information.

In S2010, the security setting control unit 356 of the management system 121 aggregates the device status summaries and stores the state summaries in the data storage unit 352. The security setting control unit 356 classifies the devices into categories according to the necessity of the security measures to be displayed on the summary screen based on the list of the devices managed by the user specified in S2008 and S2009 and the information on the degree of fit and aggregates the number of devices of each category. Subsequently, the security setting control unit 356 stores the aggregated result in the data storage unit 352. The classification according to the necessity of the security measure displayed on the summary screen in the present embodiment includes four classifications of "countermeasure is appropriate", "additional countermeasure is possible", "additional countermeasure is recommended", and "additional countermeasure is necessary". The classification according to the necessity of the security measure is used to determine the content to be displayed in the device status summary display region 902.

In S2011, the security setting control unit 356 of the management system 121 stores the status summary of the devices aggregated in S2010 as history information in the data storage unit 352. The security setting control unit 356 stores the latest status summary specified in S2010 as history information in the data storage unit 352 and deletes data older than the past seven days. Note that the criterion that the old data to be deleted is older than the past seven days is an example, and the data to be deleted is determined according to the past aggregate value displayed as auxiliary information on the device status summary screen 901.

In S2012, the security setting control unit 356 of the management system 121 aggregates the history of the status summaries of the devices managed by the user. That is, the security setting control unit 356 calculates the average value of the number of devices for each classification according to the necessity of security measures based on the history information stored in S2011 and stores the average value in the data storage unit 352. Specifically, the security setting control unit 356 calculates an average value for each of four classifications of "countermeasure is appropriate", "additional countermeasure is possible", "additional countermeasure is recommended", and "additional countermeasure is necessary" based on the history data and stores the average value in the data storage unit 352. The aggregation result of the history of the state summary is used to determine contents to be displayed in the region for displaying the aggregation value of the average of the past seven days, which is auxiliary information of the device status summary display region 902. Note that, instead of the average value, the number of devices at a certain time point in the past may be used as the aggregation result of the history of the state summary. The processing that the management system 121 executes in accordance with the setting change of the MFP 100 ends.

When a user who is an administrator of the MFP 100 confirms the security setting of the image processing device to be managed, the user performs a request to display various report screens for confirming the security setting in the web page displayed on the web browser of the PC 113. Examples of the report screen for confirming the security setting include the device detail screen 601 (FIG. 6 and FIG. 7), the device status list screen 801 (FIG. 8), and the device status summary screen 901 (FIGS. 9A and 9B). In the management system 121 that has received the display request from the web browser of the PC 113, the management information control unit 355 reads out information corresponding to the display request from the data storage unit 352 and provides a report screen as a web page to the PC 113 via the web browser communication unit 351. The information read out from the data storage unit 352 by the management system 121 to provide the report screen is an analysis result analyzed based on the use type and the setting information acquired from the image processing device by the processes as shown in FIG. 11 and is stored in the data storage unit 352. For example, the information on the degree of fit to the threat according to the use type displayed on the device detail screen 601, the reflection state of the current setting value, and the recommended setting is based on the information stored in the processes of S2003, S2005, and S2007. The information on the device status list display region 802 displayed on the device status list screen 801 is based on the information stored in the process of S2009. The information on the device status summary display region 902 that is displayed on the device status summary screen 901 is based on the information stored in the process of S2010, and the auxiliary information of the device status summary display region 902 is based on the information stored in the process of S2012.

Although in the present embodiment a configuration has been explained in which the degree of fit to the setting value recommended in the use type is used for the calculation of the degree of fit to the threat, the present invention is not limited thereto. For example, a configuration may be adopted in which a single recommended setting value is defined regardless of the use type, and the degree of fit to the single recommended setting value is displayed. Additionally, although an example in which the report screen is displayed on the web browser as a web page has been explained, the present invention is not limited thereto. For example, the report screen may be provided using typical digital information transmission means such as e-mail, and a dedicated application of a mobile terminal and a PC. In a case in which the screen is provided by the dedicated application, for example, the user accesses the management system 121 from the PC 113 and the like using a web browser and displays a web application screen that is provided by the management system 121. The management system 121 provides a report screen on the web application screen. Although the image processing device has been exemplified as a device to be managed, the device to be managed may be any communicable device such as PC, a mobile device, and an IoT device, and a configuration in which these devices are mixed may be employed.

As described above, according to the present embodiment, even when a plurality of image processing devices is managed, the administrator can easily grasp the state of the countermeasure against the security threat of the image processing device.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-004594, filed Jan. 16, 2023, which is hereby incorporated by reference wherein in its entirety.

What is claimed is:

1. A management system that manages a plurality of image processing devices comprising:
    a memory storing instructions; and
    a processor executing the instructions causing the management system to:
    acquire a use environment setting value indicating a use type selected by a user, corresponding to at least one of an environment in which each image processing device is installed and a way in which each image processing device is used from among the plurality of image processing devices;
    acquire setting information including a plurality of setting values related to security from among the plurality of image processing devices; and
    provide a report screen based on a reflection status of each setting value related to security that may be involved in each of a plurality of threats, with respect to a use type of the image processing device, for an image processing device among the plurality of image processing devices.

2. The management system according to claim 1, wherein the report screen provides information indicating, for each of a plurality of threats, the degree of fit of a reflection status indicating a ratio of a setting value reflected in the image processing device, among the setting values recommended in each set item according to the use type of an image processing device, for the image processing device specified by an administrator.

3. The management system according to claim 1, wherein the report screen provides information indicating a reflection status of a setting value for each setting item of the image processing device for each of a plurality of threats corresponding to a use type of an image processing device, for the image processing device specified by an administrator.

4. The management system according to claim 3, wherein a reflection status of a setting value for each setting item is displayed with a color indicating an enabled setting and a different color indicating a disabled setting.

5. The management system according to claim 3, wherein, when providing information on the report screen that represents the reflection status of a setting value, in a case in which a setting value for a setting item that is recommended according to the use type of an image processing device is not enabled, information in which information on the setting item is displayed with highlighting on the report screen is provided.

6. The management system according to claim 1, wherein the report screen provides information indicating, in a list, the degree of fit of a reflection status of each setting value of each image processing device to each of a plurality of threats, according to the use type of each of the plurality of image processing devices managed by an administrator.

7. The management system according to claim 6, wherein, in the list, a display color is changed and displayed according to the degree of fit of a reflection status of each setting value of each image processing device.

8. The management system according to claim 1, wherein, for a plurality of image processing devices managed by an administrator, the report screen provides information indicating the number of image processing devices classified according to the necessity of changing a setting value for reflecting a setting value recommended according to the use type of each image processing device in each image processing device.

9. The management system according to claim 1, wherein in a case in which a setting value is set in an image processing device to be managed, the management system acquires the use environment setting value indicating the use type and the setting information from the image processing device, analyzes a reflection status of each setting value that may be involved in each of a plurality of threats with respect to the use type, and stores an analyzed result in a storage unit, and
    the report screen is provided based on the analyzed result stored in the storage unit.

10. The management system according to claim 1, wherein the report screen is provided as a web page displayed on a web browser.

11. The management system according to claim 1, wherein the process further executes an instruction causing the management system to manage a correspondence between a security threat, a setting item of the image processing device and a setting value corresponding to the setting item.

12. A control method of a management system that manages a plurality of image processing devices, the method comprising:
    acquiring a use environment setting value indicating a use type selected by a user, corresponding to at least one of an environment in which each image processing device is installed and a way in which each image processing device is used from among the plurality of image processing devices;
    acquiring setting information including a plurality of setting values related to security from among the plurality of image processing devices;
    providing a report screen based on a reflection status of each setting value related to security that may be involved in each of a plurality of threats, with respect to a use type of the image processing device, for an image processing device among the plurality of image processing devices.

13. A non-transitory storage medium storing a program for causing a computer to execute a control method of a management system that manages a plurality of image processing devices, the control method comprising:
    acquiring a user environment setting value indicating a use type selected by a user, corresponding to at least one of an environment in which each image processing device is installed and a way in which each image processing device is used from among the plurality of image processing devices;
    acquiring setting information including a plurality of setting values related to security from among the plurality of image processing devices;
    providing a report screen based on a reflection status of each setting value related to security that may be involved in each of a plurality of threats, with respect to a use type of the image processing device, for an image processing device among the plurality of image processing devices.

* * * * *